US005946357A

United States Patent [19]

Sandin et al.

[11] Patent Number: 5,946,357

[45] Date of Patent: Aug. 31, 1999

[54] APPARATUS, AND ASSOCIATED METHOD, FOR TRANSMITTING AND RECEIVING A MULTI-STAGE, ENCODED AND INTERLEAVED DIGITAL COMMUNICATION SIGNAL

[75] Inventors: Tomas Sandin, Stockholm; Paul Teder, Täby; Håkan Persson, Solna, all of Sweden

[73] Assignee: Telefonaktiebolaget L M Ericsson, Stockholm, Sweden

[21] Appl. No.: 08/784,146

[22] Filed: Jan. 17, 1997

[51] Int. Cl.[6] .......... H04K 1/02

[52] U.S. Cl. .......... 375/296; 375/262; 375/341; 371/37.4

[58] Field of Search .......... 375/341, 295, 375/296, 261, 262, 279, 280; 371/37.11, 43.3, 43.4, 37.4, 37.5

[56] References Cited

U.S. PATENT DOCUMENTS

| | | | |
|---|---|---|---|
| 5,023,889 | 6/1991 | Divsalar et al. | 375/27 |
| 5,321,725 | 6/1994 | Paik et al. | 375/341 |
| 5,392,299 | 2/1995 | Rhines et al. | 371/37.5 |
| 5,400,347 | 3/1995 | Lee | 371/37.4 |
| 5,519,734 | 5/1996 | Ben-Efraim | 375/341 |
| 5,659,578 | 8/1997 | Alamouni et al. | 375/261 |

FOREIGN PATENT DOCUMENTS

WO 96/16496 5/1996 WIPO .

OTHER PUBLICATIONS

European Patent Office, International Standard Search Report, May. 7, 1998 File SE 98/00035.

PG Andermo, CODIT Final Review Report, UMTS Code Division Testbed (CODIT), Issue 2.0, Nov. 21, 1995, pp. 1–94.

*Primary Examiner*—Chi H. Pham
*Assistant Examiner*—Emmanuel Bayard
*Attorney, Agent, or Firm*—Jenkens & Gilchrist, P.C.

[57] ABSTRACT

Apparatus and associated method for improving the radio link performance of a radio communication system, such as a cellular communication system. Multi-stage encoding and interleaving of the data bits of a digital information signal is performed at a single logical device, such as a radio base station. By performing two stages of interleaving over the same number of information frames of the data bits, only a single buffering stage is required to perform such multi-stage interleaving.

27 Claims, 6 Drawing Sheets

50
28
102
N-FRAME BUFFER
32
OUTER ENCODER
36
OUTER INTERLEAVER
42
INNER ENCODER
46
INNER INTERLEAVER
106
106
106
106
106
CONTROL DEVICE
104

INFO. SOURCE
SOURCE ENCODER
OUTER ENCODER
OUTER INTERLEAVER
INNER ENCODER
INNER INTERLEAVER
MODULATOR
RX CIRCUITRY
DEMODULATOR
TX CIRCUITRY
INNER DEINTERLEAVER
INNER DECODER
OUTER DEINTERLEAVER
OUTER DECODER
SOURCE DECODER
INFO. SINK
10
12
14
16
22
24
26
28
32
33
34
36
38
42
44
46
50
51
52
54
56
58
62
64
66
68
72
74
76
80
81
82
84
86
88
92

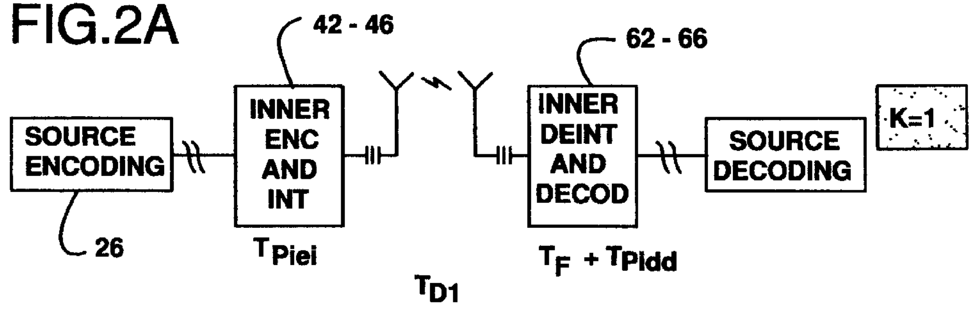
FIG.2A
42 - 46
62 - 66
SOURCE ENCODING
INNER ENC AND INT
INNER DEINT AND DECOD
SOURCE DECODING
K=1
26
TPiei
TF + TPidd
TD1

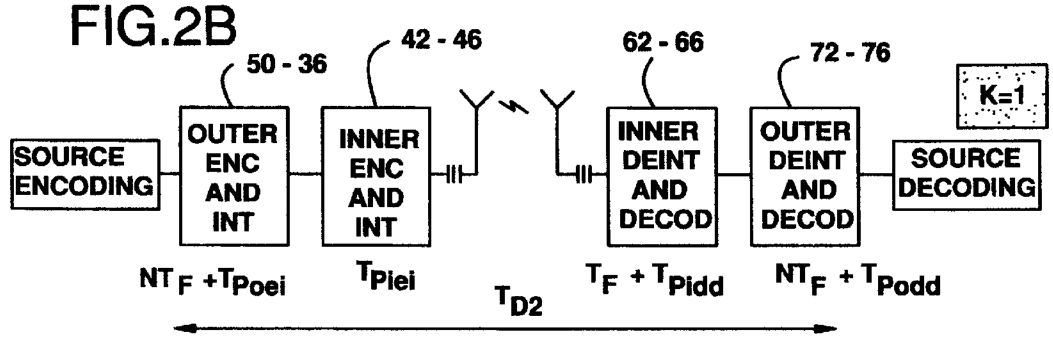
FIG.2B
50 - 36
42 - 46
62 - 66
72 - 76
K=1
SOURCE ENCODING
OUTER ENC AND INT
INNER ENC AND INT
INNER DEINT AND DECOD
OUTER DEINT AND DECOD
SOURCE DECODING
NTF +TPoei
TPiei
TF + TPidd
NTF + TPodd
TD2

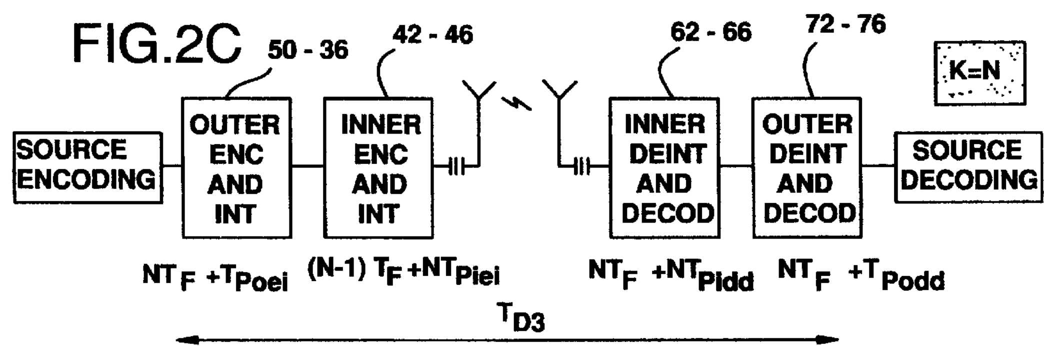
FIG.2C
50 - 36
42 - 46
62 - 66
72 - 76
K=N
SOURCE ENCODING
OUTER ENC AND INT
INNER ENC AND INT
INNER DEINT AND DECOD
OUTER DEINT AND DECOD
SOURCE DECODING
NTF +TPoei
(N-1) TF +NTPiei
NTF +NTPidd
NTF +TPodd
TD3

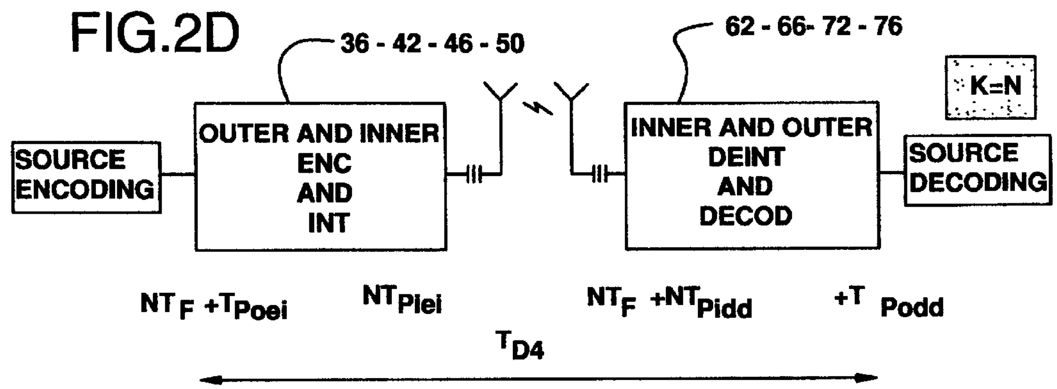
FIG.2D
36 - 42 - 46 - 50
62 - 66- 72 - 76
K=N
SOURCE ENCODING
OUTER AND INNER ENC AND INT
INNER AND OUTER DEINT AND DECOD
SOURCE DECODING
NTF +TPoei
NTPiei
NTF +NTPidd
+T Podd
TD4

150
ENCODER DATA STREAM
READ IN
READ OUT
154
INTERLEAVED DATA STREAM

APPARATUS, AND ASSOCIATED METHOD, FOR TRANSMITTING AND RECEIVING A MULTI-STAGE, ENCODED AND INTERLEAVED DIGITAL COMMUNICATION SIGNAL

The present invention relates generally to the transmission of a digital communication signal on a communication channel, such as a communication channel forming a link between a radio base station and a mobile terminal of a cellular communication system. More particularly, the present invention relates to transmitter apparatus, and an associated method, for forming a multi-stage, interleaved and encoded communication signal and to receiver apparatus, and an associated method, for deinterleaving and decoding a multi-stage interleaved and encoded communication signal.

Improved radio link performance is provided to overcome, e.g., distortion of the communication signal caused by fading and other distortion during transmission of the signal upon the communication channel. The informational content of the communication signal can be recreated with a bit error rate of less than $10^{-6}$ without introducing significant amounts of signal transmission delay.

When embodied in a cellular communication system in which communication signals are transmitted upon channels susceptible to multi-path fading, improved radio link performance is provided without an increase in the transmission delay otherwise required to provide multi-stage encoding and interleaving. The multi-stage encoding and interleaving can be performed at a single logical device, such as at a radio base station of the cellular communication system.

BACKGROUND OF THE INVENTION

Communication systems are increasingly constructed to permit the utilization of digital communication techniques by which to communicate information between a sending station and a receiving station. In a radio communication system, the communication channel is formed of a portion of the electromagnetic spectrum, i.e., the "bandwidth" allocated to the communication system.

A cellular communication system is a type of radio communication system and is exemplary of a type of communication system which is increasingly constructed to utilize digital communication techniques.

By utilizing a digital communication technique, the information of a communication signal can typically be more efficiently communicated between the sending station and the receiving station. In a radio communication system, the bandwidth allocated to the radio communication system is typically limited. The improved efficiency provided by the utilization of a digital communication technique permits the allocated bandwidth to be utilized more efficiently. By utilizing a digital communication technique, the communication capacity of such a radio communication system can sometimes be increased. In radio communication systems, the communication capacity of the system is limited by the allocated bandwidth. In a multi-user, radio communication system, for instance, an increase in the communication capacity permits additional users to communicate by way of the communication system.

A radio frequency link forming a communication channel between a sending station and a receiving station of a radio communication system is typically not an ideal, loss-free communication channel. A communication signal might be susceptible to degradation caused by multi-path fading. If significant, such fading might prevent the accurate recovery at the receiving station of the informational content of at least the portions of the communication signal subjected to such fading.

To increase the probability that the informational content of a digital communication signal transmitted by the sending station can be recovered once received at the receiving station, the data bits which are modulated to form the communication signal are sometimes encoded according to an encoding technique. Coding of the signal increases the redundancy of the signal. Even if portions of the communication signal are so distorted as to prevent some of the data bits modulated thereon to be recovered, the increased redundancy introduced by encoding the data bits increases the probability that the informational content of the signal can be recreated at the receiving station.

Various block and convolutional coding techniques have been developed to increase the redundancy of the signal at a sending station. Corresponding block and convolutional decoding techniques have similarly been developed to decode the communication signal, once received at the receiving station.

In at least one type of block coding technique, check bits are concatenated to blocks of data bits of which the communication signal is to be formed. The check bits are of values dependent upon the values of the data bits of such blocks of data.

In at least one type of convolutional coding technique, a coded sequence is formed of the data bits. The values of the bits of the coded sequence are dependent upon not only the bit values of the data bits which are to be encoded but also upon bit values of preceding bit sequences of data bits previously encoded.

Encoding of the data bits which are modulated to form a communication signal advantageously facilitates the recreation of the informational content of the signal when the interference introduced upon the signal is of short duration. If, however, the interference introduced upon the communication signal is of a lengthier duration, e.g., greater than several bits, encoding of the data bits does not ensure that the informational content of the signal shall be able to be accurately recreated.

Various interleaving techniques have been developed to reduce the possibility that interference introduced upon a communication signal during its transmission upon a communication channel shall prevent the recovery of the informational content thereof.

When the data bits are interleaved, consecutive data bits of the communication signal are "spread-out" so as not to be transmitted consecutively. Once the communication signal is received at the receiving station, the data bits are recombined. Because the data bits are spread-out over time, distortion is less likely to distort the consecutive bits in a manner to prevent the recreation of their informational content, once received at the receiving station.

Digital communication techniques are utilized in various cellular communication systems. For instance, a cellular communication system constructed pursuant to the standard specification of the Global System for Mobile communications (GSM) utilizes a digital communication technique. And, a cellular communication system constructed according to the EIA/TIA IS-95 specification, a CDMA (Code Division Multiple Access) system similarly utilizes digital communication technique. Prior to transmission of communication signals generated during operation of such systems, the data bits, of which the communication signals are formed, are encoded and interleaved. In a CDMA-based system, modulation is typically preceded by spreading of the coded and interleaved bits by a code sequence. Corresponding despreading is performed at a receiver. Operational protocols for the encoding and interleaving of data bits are also set forth in the respective standard specifications. Corresponding decoding and deinterleaving protocols are also set forth.

Although encoding and interleaving of the data bits of a communication signal increase the possibility that the informational content of the communication signal, subjected to interference during its transmission upon the communication channel, can be recreated, such encoding and interleaving, causes signal transmission delay. Interference may be caused, e.g., by distortion due to noise and both adjacent- and co-channel interference. In a CDMA-based system, interference can be caused from other users. The corresponding decoding and deinterleaving, causes additional signal transmission delay. If extensive, the transmission delay can also interfere with the quality of communications between a sending station and a receiving station.

When the radio communication system is utilized to transmit data rather than speech information, radio link performance is of increased significance. For instance, a bit error rate of $10^{31\ 3}$ is normally acceptable when the communication signal is formed of speech information. However, when data forms the informational content of the communication signal, a bit error rate performance of better than $10^{-6}$ is instead sometimes required.

Such a level of radio link performance requires additional encoding and interleaving of the data bits of a communication signal to be transmitted. However, if there is a correspondent increase in the signal transmission delay caused as a result of the additional encoding and interleaving, the resultant signal delay might be unacceptably large.

Utilization of a multi-stage encoding and interleaving technique permits the radio link performance to be improved. However, conventional multi-stage encoding and interleaving techniques typically introduce unacceptably large signal transmission delay.

A manner by which the radio link performance can be improved without causing a corresponding increase in the transmission delay would be advantageous.

It is in light of this background information relating to digital communication techniques that the significant improvements of the present invention have evolved.

SUMMARY OF THE INVENTION

The present invention advantageously provides transmitter apparatus, and an associated method, for forming a multi-stage interleaved and encoded communication signal. The present invention further advantageously provides receiver apparatus, and an associated method, for deinterleaving and decoding the multi-stage interleaved and encoded communication signal.

The multi-stage interleaving and encoding of a communication signal facilitates recovery of the informational content of the signal subsequent to its transmission upon a communication channel susceptible to interference, such as a communication channel susceptible to multi-path fading.

Improved radio link performance is provided to overcome distortion of the communication signal caused by such multi-path fading during transmission of the signal upon the communication channel.

In one aspect of the present invention, transmitter apparatus forms a multi-stage encoded and interleaved signal. Outer, block encoding is performed across a selected number of frames of information, i.e., "data", bits which form a communication signal to be transmitted upon a communication channel. An outer interleaver interleaves groups of bits across the selected number of frames. An inner encoder convolutionally encodes bits of each of the frames of data bits. And, an inner interleaver interleaves bits across the selected number of frames.

In an another aspect of the present invention, receiver apparatus decodes and deinterleaves a communication signal formed of a multi-stage, encoded and interleaved set of frames of data bits received thereat. An inner deinterleaver deinterleaves at least selected bits across a selected number of the successive frames of the bits. An inner decoder convolutionally decodes bits of each of the frames of the selected number of the successive frames. An outer deinterleaver deinterleaves groups of bits across the selected number of frames of the bits. And, an outer block decoder decodes blocks of the bits across the selected number of the successive frames of the bits.

Because the outer and inner interleaver interleave groups of data bits and individual ones of the data bits, respectively, across the same number of selected frames, only a single buffering stage is required to buffer the selected number of frames to permit the respective interleaving operations to be performed.

Analogously, because the inner deinterleaver and outer deinterleaver deinterleave data bits and groups of data bits, respectively, across the same number of frames, only a single buffer is required to buffer the signal to permit both deinterleaving operations to be performed.

Because only a single buffering stage is required by the transmitter apparatus to form the multi-stage interleaved and encoded signal, and only a single buffering stage is required by the receiver apparatus, a substantial reduction in the signal transmission delay is possible.

In another aspect of the present invention, apparatus positioned at a radio base station operable in a cellular communication system forms a multi-stage encoded and interleaved signal for communication upon a communication channel susceptible at least to multi-path fading. Outer interleaving and encoding is performed across a selected number of frames of the bits into which a sequence of data bits is formatted. An inner encoder encodes data bits of each of the frames of the selected number of frames. And, an inner interleaver interleaves data bits across the selected number of frames. Modulation apparatus thereafter modulates the multi-stage—encoded and interleaved frames of bits. And, the resultant signal is transmitted to a remotely-positioned mobile terminal.

The radio base station further includes analogous multi-stage decoding and deinterleaving apparatus for decoding and deinterleaving a multi-stage encoded and interleaved signal transmitted thereto. A buffer buffers a selected number of frames of the signal received at the radio base station. An inner deinterleaver deinterleaves data bits of the selected number of frames buffered by the buffer. An inner decoder decodes data bits of each of the selected number of frames buffered by the buffer. An outer deinterleaver deinterleaves groups of data bits across the frames buffered by the buffer. And, an outer decoder block decodes groups of data bits across the frames buffered by the buffer.

When embodied in a cellular communication system, a mobile terminal is constructed to include apparatus analogous to the apparatus forming portions of a radio base station to deinterleave and decode signals transmitted thereto by a radio base station. The mobile terminal is similarly also constructed to include apparatus to encode and interleave signals to be communicated to the radio base station.

In these and other aspects, therefore, apparatus encodes and interleaves data bits formatted into frames to form a communication signal which is to be transmitted upon a communication channel from a communication station to a remote device. An outer encoder is coupled to be provided with the data bits. The outer encoder encodes at least selected data bits across a selected number of the frames of the data bits. An outer interleaver is coupled to be provided with the communication signal, once encoded by the outer encoder. The outer interleaver interleaves at least selected data bits across the selected number of the frames of the data bits. An inner encoder is coupled to be provided with the frames of data bits once interleaved by the outer interleaver. The inner encoder encodes at least selected data bits of each frame of the selected number of the frames of the data bits. An inner interleaver is coupled to be provided with the frames of data bits once encoded by the inner encoder. The inner interleaver interleaves at least selected data bits across the selected number of the frames of the data bits.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIGS. 2A–D illustrates portions of the communication system shown in FIG. 1.

DETAILED DESCRIPTION OF THE PRESENT INVENTION

Figure 1:
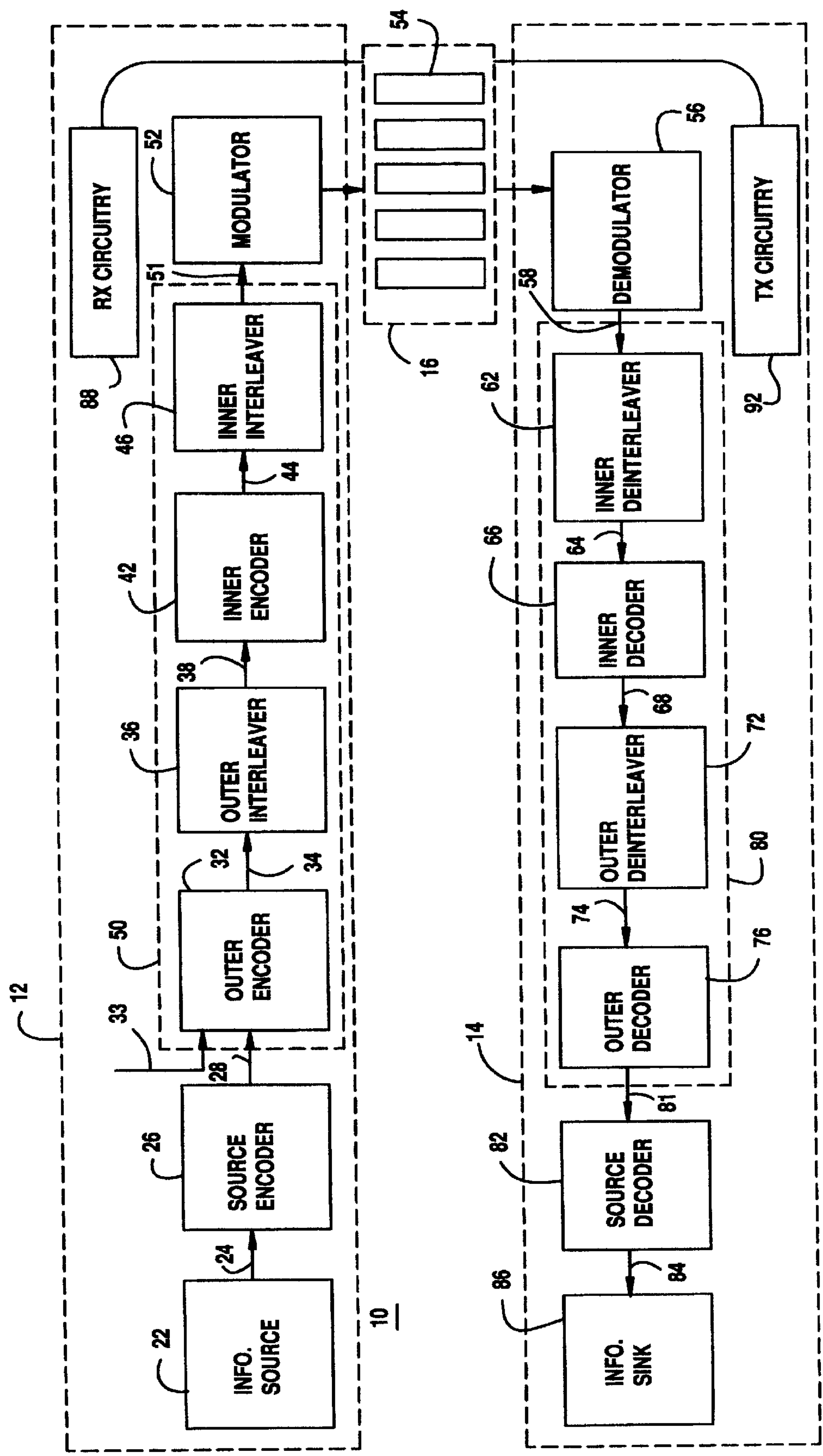
FIG. 1 illustrates a functional block diagram of a cellular communication system in which an embodiment of the present invention is operative.

Referring first to FIG. 1, a portion of a cellular communication system, shown generally at 10, illustrates a network infrastructure portion 12 and a single mobile terminal 14. The infrastructure portion 12 and the mobile terminal 14 are interconnected by way of a communication channel 16 which forms a link therebetween. The channel 16 may, e.g., be susceptible to multi-path fading.

It should be noted at the outset that, while the various embodiments of the present invention shall be described with respect to a cellular communication system, the present invention can similarly be embodied in other types of wireless communication systems, such as, e.g., an RLL (Radio in the Local Loop) communication system or a satellite communication system. The present invention can be embodied in other full duplex communication systems, as well as half-duplex, and simplex communication systems.

During operation of the cellular communication system 10, communication signals are transmitted between the infrastructure portion 12 and the mobile terminal 14. An embodiment of the present invention is operable to improve the radio link performance of the system. Data bits, formatted into frames, which are to be communicated between the portion 12 and the mobile terminal 14 are interleaved and encoded. Once interleaved and encoded, the bits are modulated upon a carrier wave. Interleaving and encoding facilitates their re-creation at a receiving station subsequent to transmission upon a communication channel which exhibits interference, such as that caused by multi-path fading.

An information signal, here shown functionally to be generated by an information source 22, is provided by way of line 24 to a source encoder and formatter 26. The source encoder 26, in one embodiment, digitizes the information signal applied thereto and formats digitized data bits into frames. A source-encoded signal generated by the encoder 26 is applied, by way of line 28, to an outer channel encoder 32. Line 33 extending to the outer channel encoder 32 is further illustrated in the figure. Data bits formed of internal-control, signaling bits are also selectively provided to the encoder 32 on the line 33.

In one embodiment, as shall be described below, the outer channel encoder 32 forms a block encoder for block encoding the data bits of the signal applied thereto according to a selected block encoding technique. Through such block encoding, the redundancy of the data bits of the signal applied thereto is increased. While the exemplary embodiment illustrates the encoder 32 to be formed of a block encoder, in other embodiments, the encoder encodes the bits of the signal applied thereto in other manners.

The outer channel encoder 32 is coupled, by way of line 34, to an outer interleaver 36. The outer interleaver 36 is operable to interleave groups of bits across successive ones of the frames into which the data bits are formatted by the source encoder and formatter 26. The outer encoder 32 and the outer interleaver 36 provide a first stage of encoding and interleaving of the data bits of the signal generated by the information source 22.

The outer interleaver 36 is coupled by way of line 38 to an inner encoder 42. The inner encoder 42, in one embodiment, forms a convolutional encoder for convolutionally encoding the signal applied thereto. The inner encoder is here further operable to encode the data bits of each frame applied to the encoder. While the exemplary embodiment illustrates the encoder 42 to be formed of a convolutional encoder, in other embodiments, the encoder encodes the bits of the signal applied thereto in other manners.

The inner encoder is coupled by way of line 44 to an inner interleaver 46. The inner interleaver is operable to interleave data bits across successive ones of the frames of data bits applied thereto. The inner encoder 42 and the inner interleaver 46 together form a second stage of encoding and interleaving of the information signal.

The encoders 32 and 42 and interleavers 36 and 46 together form the apparatus 50 of an embodiment of the present invention for forming a multi-stage interleaved and encoded communication signal. In one embodiment, the apparatus 50 is formed at a radio base station of a cellular communication system.

The inner interleaver 46 is coupled by way of line 51 to a modulator 52. The modulator 52 is operable to modulate the signal applied thereto according to a modulation technique, such as, e.g., a GMSK (Gaussian Minimum Shift Keying) modulation or a QPSK (Quadrature Phase Shift Keying) modulation technique. Typically, for CDMA-based systems, spreading of the coded and interleaved bits by a code (spreading) sequence is performed prior to modulation. Correspondingly, subsequent to demodulation, a despreading is performed. In conventional manner, the modulator is operable to modulate the signal applied thereto upon a carrier wave, thereby to form a communication signal of characteristics to permit its transmission upon the communication channel 16. As illustrated in the figure, the communication channel 16 includes a plurality of paths 54 upon which the communication signal is transmitted to the mobile terminal 14. Because the communication channel 16 includes multiple numbers of paths, the communication signal is susceptible to fading during its transmission thereon.

The mobile terminal 14 includes demodulator circuitry 56 for demodulating the communication signal received at the mobile terminal 14. The demodulator 56 is operable in a manner generally reverse to that of the modulator 52. The demodulator 56 generates a digitized signal on line 58 which is applied to an inner deinterleaver 62.

The inner deinterleaver 62 is operable in a manner generally reverse to that of the inner interleaver 46 to deinterleave bits of the signal applied thereto.

The inner deinterleaver 62 is coupled by way of line 64 to an inner decoder 66. The inner decoder is operable in a manner generally reverse to that of the inner encoder 42 to convolutionally decode the signal applied thereto. The inner deinterleaver 62 and the inner decoder 66 perform a first stage of deinterleaving and decoding of the signal received by the mobile terminal 14, once demodulated by the demodulator 56.

The inner decoder 66 is coupled by way of lines 68 to an outer deinterleaver 72. The outer deinterleaver 72 is operable in a manner generally reverse to that of the outer interleaver 36. The outer deinterleaver deinterleaves groups of bits of the signal applied thereto.

The outer deinterleaver 72 is coupled by way of lines 74 to an outer channel decoder 76. The outer channel decoder is operable in a manner generally reverse to that of the outer channel encoder 32. The outer channel encoder is operable to block decode groups of bits of the signal applied thereto.

The inner and outer deinterleavers 62 and 72 and inner and outer decoders 66 and 76 together form the apparatus 80 of an embodiment of the present invention for deinterleaving and decoding a multi-stage interleaved and encoded signal.

The outer channel decoder 76 is coupled by way of line 81 to a source decoder 82. The source decoder is operable in a manner generally reverse to that of the source encoder 26 and generates a source-decoded signal on line 84 which is applied to an information sink 86.

Full duplex communication is permitted between the network infrastructure portion 12 and the mobile terminal 14. The network infrastructure portion 12 includes receiver circuitry, here represented by block 88, which is generally functional in a manner analogous to the elements forming the receiver circuitry of the mobile terminal 14. And, analogously, the mobile terminal 14 includes transmitter circuitry, represented by the block 92, which is operable in manners similar to the elements of the transmitter circuitry shown to form a portion of the network infrastructure portion 12.

The multi-stage encoding and interleaving of the information signal generated by the information source 22 increases the possibility that the informational content of the information signal can be recreated even if the communication channel 16 upon which the modulated communication transmitted by the portion 12 exhibits significant levels of multi-path fading.

Appropriate coding and interleaving operations performed upon the data bits of the information signal generated by the information source 22 provide bit error rate performance good enough to permit the transmission of data. Data transmission requiring such a high radio link performance might be required in mobile radio environments to transmit, for instance, wireless multimedia, required to perform worldwide web browsing and also video transmissions.

As mentioned previously, encoding and interleaving operations introduce transmission delay. Such transmission delay results from the need both to encode and interleave the data bits as well as to decode and deinterleave the data bits. Additionally, to perform such operations across more than one frame typically requires that such successive frames be buffered for purposes of performing the interleaving, as well as deinterleaving, operations. When the outer interleaving and inner interleaving operation functions are performed separately, buffering of sequences of frames of the information signal is typically required before the performance of such operations. Analogously, when the inner and outer deinterleaving operations are performed as separate functions, separate buffering is required prior to the performance of such deinterleaving operations.

However, by performing outer and inner interleaving across the same number of frames permits a reduction in the transmission delay as only a single buffering stage is required to perform the interleaving operations and a single buffering stage is required to perform the deinterleaving operations. That is to say, a reduction in the transmission delay is permitted if an N number of frames across which outer interleaving is performed corresponds in number with a K number of frames across which inner interleaving is performed, i.e., N=K.

In an embodiment of the present invention, the encoders 32 and 42 and the interleavers 36 and 46 are positioned together at a single logical device, and the outer and inner interleavers 36 and 46 are operable to perform separate interleaving functions over the same group of frames. A co-working functionality between such operations is provided. Because the outer and inner interleaver are operable over the same number of frames, only a single buffering stage is required to buffer the frames over which the interleaving is to be performed.

Similarly, only a single buffering stage is required at the mobile terminal to perform both inner and outer deinterleaving operations. Thereby, the transmission delay accompanied with a second buffering stage is obviated. The interleaving span of the inner interleaver can be made as long as the span of the outer interleaver, all without affecting the total delay significantly. By making the size of the inner interleaver as large as possible for a given total delay, the performance of the transmission scheme is optimized.

FIGS. 2A–D illustrate the various transmission delays caused by operation of selected elements forming a portion of the communication system 10 shown in FIG. 1. Review of such figures illustrates the variance in transmission delay resulting from selection of the links of the frames upon which interleaving and encoding, and corresponding deinterleaving and decoding, operations are performed and the functional locations at which such operations are performed.

First, FIG. 2A illustrates the transmission delay introduced between the inner encoder and interleaver 42–56 and inner deinterleaver and decoder 62–66. The total transmission delay $T_{D1}$ is as follows.

$$T_{D1}=T_F+T_{Piei}+T_{Pidd}$$

wherein:

$T_{Piei}$: processing delay of the inner encoder and interleaver $T_F$: frame delay $T_{Pidd}$: processing delay of the inner decoder and deinterleaver.

FIG. 2B illustrates an additional portion of the communication 10 shown in FIG. 1. Here, again, the elements 42–46 and 62–66 are again illustrated. In FIG. 2B, the outer encoder and interleaver 36–50 and outer deinterleaver and decoder 72–76 are further illustrated. The transmission delay $T_{D2}$, when K=1 can be represented as:

$$T_{D2}=2NT_F+T_F+T_{Piei}+T_{Pidd}+T_{Poei}+T_{Podd}$$

wherein:

$T_{Poei}$: processing delay of the outer encoder and interleaver $T_{Podd}$: processing delay of the outer decoder and deinterleaver and wherein the remaining terms are as defined previously.

FIG. 2C illustrates the same structure as that illustrated in FIG. 2B. Here, however, the transmission delay $T_{D3}$ is shown when K=N. The transmission delay $T_{D3}$ is as follows:

$$T_{D3}=2NT_F+(2N-1)\ T_F+NT_{Piei}+NT_{Pidd}+T_{Poei}+T_{Podd}$$

wherein the elements are as defined previously.

FIG. 2D illustrates again the structure shown previously in FIGS. 2B and 2C. Here, however, the functionality of such elements are performed at single logical devices at the transmit and receive sides of the communication system. The transmission delay, $T_{D4}$ is as follows:

$$T_{D4}=2NT_F+NT_{Piei}+NT_{Pidd}+T_{Poei}+T_{Podd}$$

wherein the terms as defined previously.

Comparison of the various transmission delays illustrates that the transmission delay associated with the structures shown in FIG. 2D is roughly the same as that shown in 2B whereas, in contrast, the structures shown in FIG. 2C has about twice the amount of delay as that of FIG. 2D.

Figure 3:
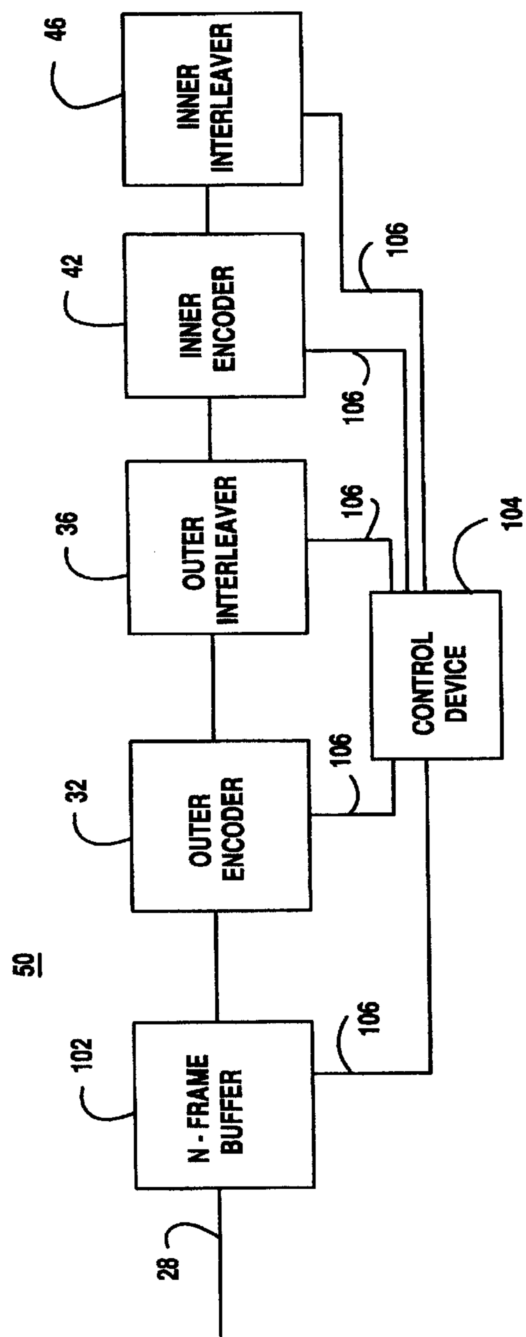
FIG. 3 illustrates a functional block diagram of part of the network infrastructure portion of the communication system shown in FIG. 1 in greater detail.

FIG. 3 illustrates the apparatus 50 in greater detail. Again, the apparatus is shown to include an outer channel encoder 32 coupled to receive a source-encoded signal generated on line 28. The apparatus is here shown to include a buffer 102 for buffering N frames of data. Once buffered, groups of data bits of the frame buffered by the buffer 102 are encoded by the outer encoder 32 and interleaved by the interleaver 36 across frames of the data. Thereafter, and as described previously, the data bits are encoded by the inner encoder 42 and interleaved by the inner interleaver 46. The apparatus 50 is further shown to include a control device 104, coupled to the encoders 32 and 42, the interleavers 36 and 46, and the buffer 102 by way of control lines 106. The control device 104 is operable, inter alia, to select and otherwise control the coding rates of the encoders, to select and control the manners by which the interleavers are operable, such as, e.g., the interleaving depth and width, and to select and control the number of N frames buffered by the buffer 102. The control device provides, e.g., the ability to recreate later, service-specified tailored encoding and interleaving schemes. The control device 104 thereby forms a code rate selector and frame number selector and is able also to control the width and depth of both the outer and inner interleaving as well as the group size of the groups that the outer interleaver interleaves.

Figure 4:
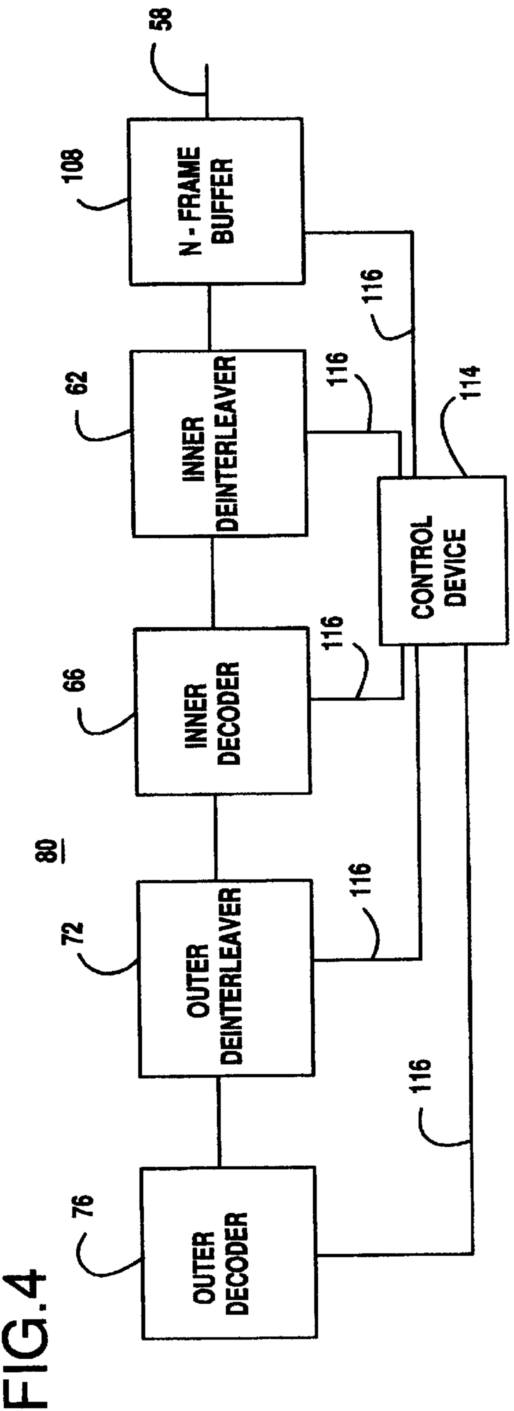
FIG. 4 illustrates a functional block diagram of part of the mobile terminal of the communication system shown in FIG. 1 in greater detail.

FIG. 4 illustrates in greater detail the apparatus 80, shown previously in FIG. 1. Here, a buffer 108 is positioned between the line 58 and the inner deinterleaver 62. The buffer 108 buffers N frames of the demodulated signal formed by the demodulator 56 (shown in FIG. 1). Data bits of the frames of data bits buffered by the buffer 108 are deinterleaved by the inner deinterleaver 62 and decoded by the decoder 66. In one embodiment, the N-frame buffering can be performed in the inner deinterleaver and a separate device 108 is not necessary. Then, as described previously, groups of data bits of the frames of data bits are deinterleaved by the outer deinterleaver 72, and block decoding of groups of the data bits of the frames of data bits is effectuated by the outer decoder 76. The apparatus 80 is further shown to include a control device 114, coupled to the decoders 66 and 76, the deinterleavers 62 and 72, and the buffer 108 by way of the control lines 116. The control device 114 is operable, inter alia, to select and control the decoding rates of the decoders, to select and control the manners by which the deinterleavers are operable, and to select the number of N frames buffered by the buffer 108.

Because the same number of frames of data bits are interleaved by the outer and inner interleavers 36 and 46 and deinterleaved by the deinterleavers 62 and 72, the frames are required to be buffered only once during generation of the communication signal and only once during recovery of the informational content once received at the apparatus 80.

Figure 5:
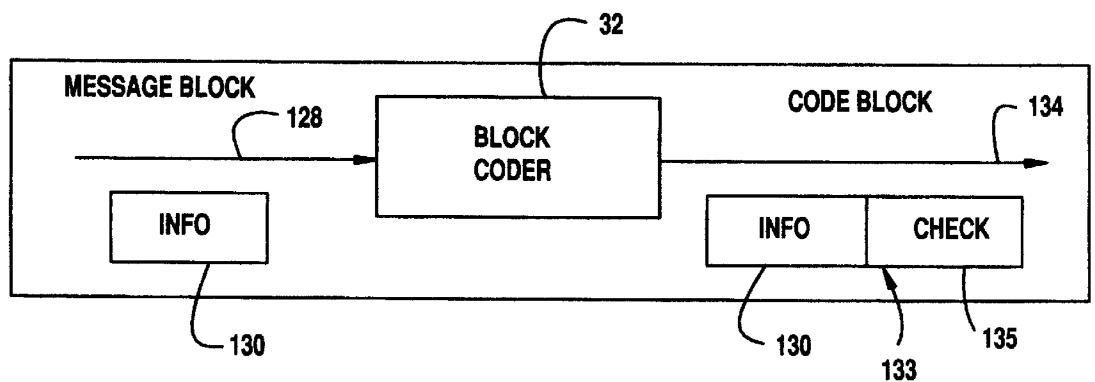
FIG. 5 illustrates a functional block diagram of a block encoder, representative of the outer encoder of the transmitter portion shown in FIG. 3.

FIG. 5 illustrates operation of an exemplary block coder, also shown at 32, of which the outer channel encoder 32 might be formed. Examples of block codes are Reed-Solomon codes and BCH (Bose, Chadhuri, Hocquenhem) codes. As illustrated in the figure, a message block of data bits are applied, here by way of line 128 to the block encoder 32. The block encoder 32 generates a code block 133 on line 134, here illustrated to be formed of both the message block 130 and check bits 135. The check bits 135 are dependent upon values of the data bits of the message block 130. While not separately shown, the decoder 76 can be analogously formed to be operable in a manner generally reverse to that shown in FIG. 5.

Figure 6:
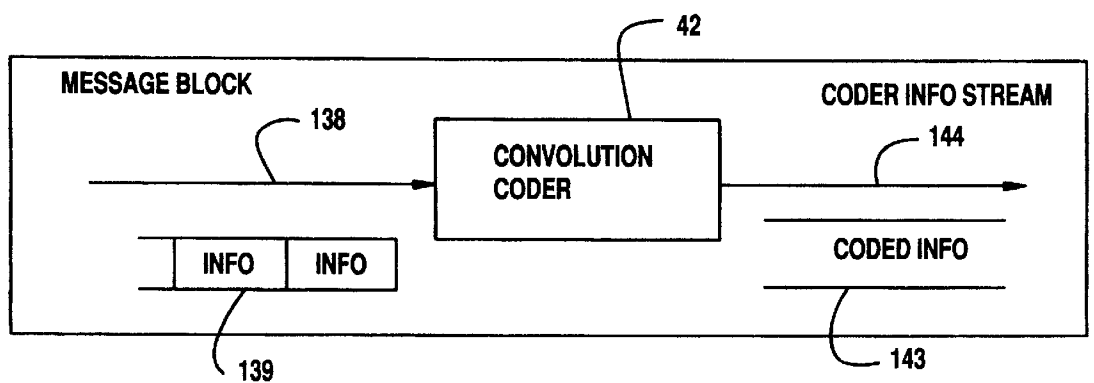
FIG. 6 illustrates a functional block diagram of a convolutional encoder representative of the inner encoder of the transmitter portion shown in FIG. 3.

FIG. 6 illustrates an exemplary convolutional encoder, also shown at 42, of which the inner encoder 42 may be comprised. Input line 138 is coupled to the encoder 42 to provide message blocks 139 of data bits to the encoder. In a convolutional encoder, code symbols generated by the encoder are of values dependent not only upon the digits in a current message block shifted into the encoder but also upon values of message blocks previously applied to the encoder.

In the exemplary illustration of FIG. 6, each bit of the message blocks 139 applied to the encoder 42 is coded into two bits which form a coded information stream 143 generated on line 144. While not separately shown, the decoder 66 can be analogously formed to be operable in a manner generally reverse to that shown in FIG. 6.

Figure 7:
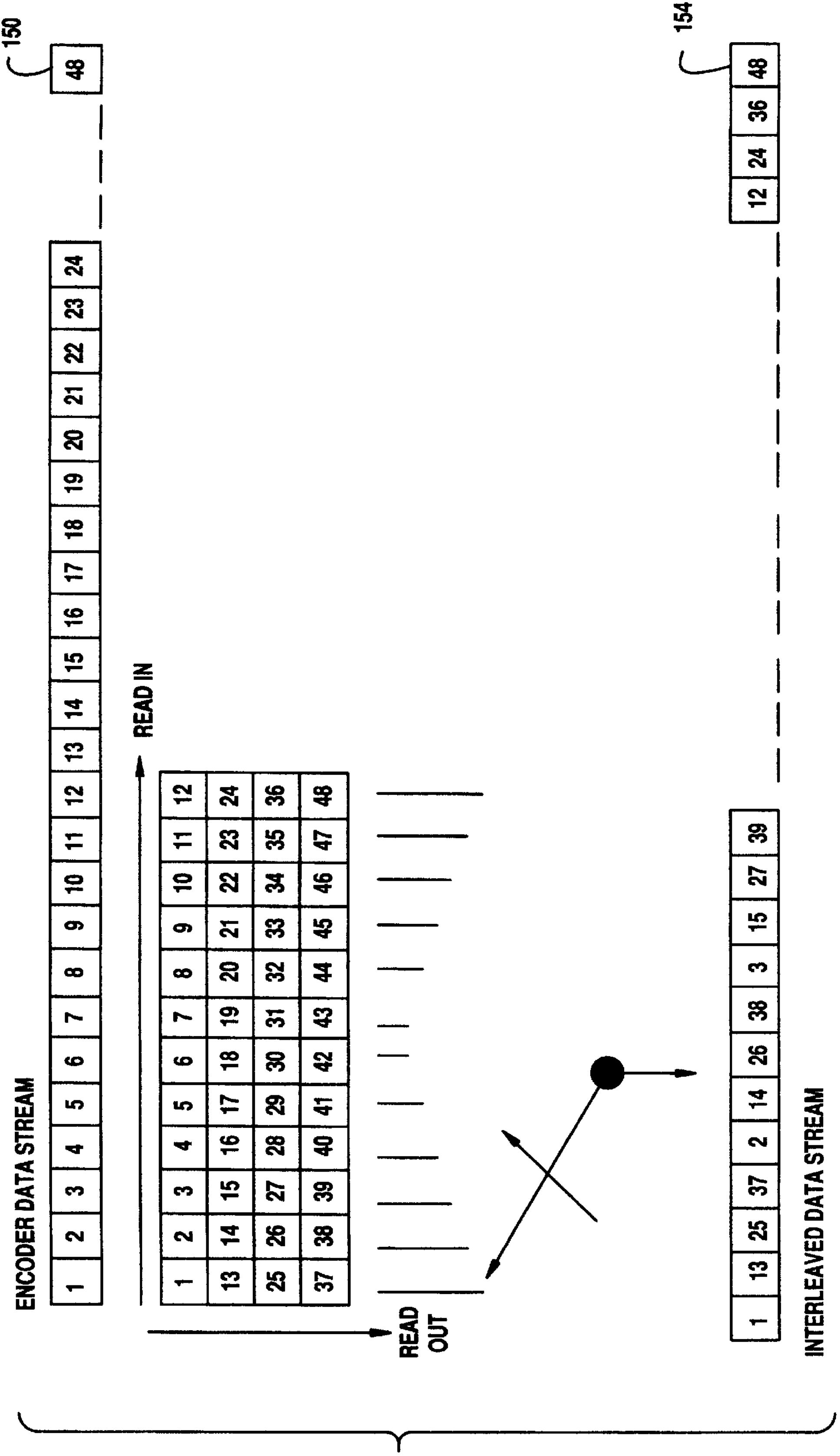
FIG. 7 illustrates a logical diagram showing operation of an interleaver of the transmitter portion shown in FIG. 3.

FIG. 7 illustrates operation of an exemplary block interleaver to interleave data bits of frames of data together. In the example shown, a data bit stream 150 is split into rows of data bit streams and arranged in a matrix-like manner in stage 152. The data bit stream is here of a length of at least N frames of signal bits.

The data stream 150 is thus read-in-row-wise. The interleaved data bit stream 154 is then generated by column-wise reading out from stage 152, the data bits, as shown in FIG. 7.

The number of rows in the stage 152, define the interleaving depth and the number of columns define the interleaving width of the interleaver. In this example the interleaving width is 12 and the interleaving depth is four. By interleaving the data bits in such manner, a fading dip exhibited upon a communication channel upon which the interleaved signal is transmitted does not result in the loss of an entire frame of the input data bits; rather, individual bits of several of the frames are lost. Recovery of the informational content of a frame is more likely if only small portions of the informational content of a frame are lost. Although FIG. 7 illustrates an operation of a block interleaving, other types of interleaving, such as for example convolutional interleaving, could also be considered, along with the control possibilities that such an interleaving offers.

While not separately shown, interleaving of groups of data bits, such as groups of eight data bits, can similarly be interleaved amongst successive frames of data bits. Deinterleaver operations, such as those performed by the deinterleavers 62 and 72 are generally reverse to the interleaver operation illustrated in the figure.

Figure 8:
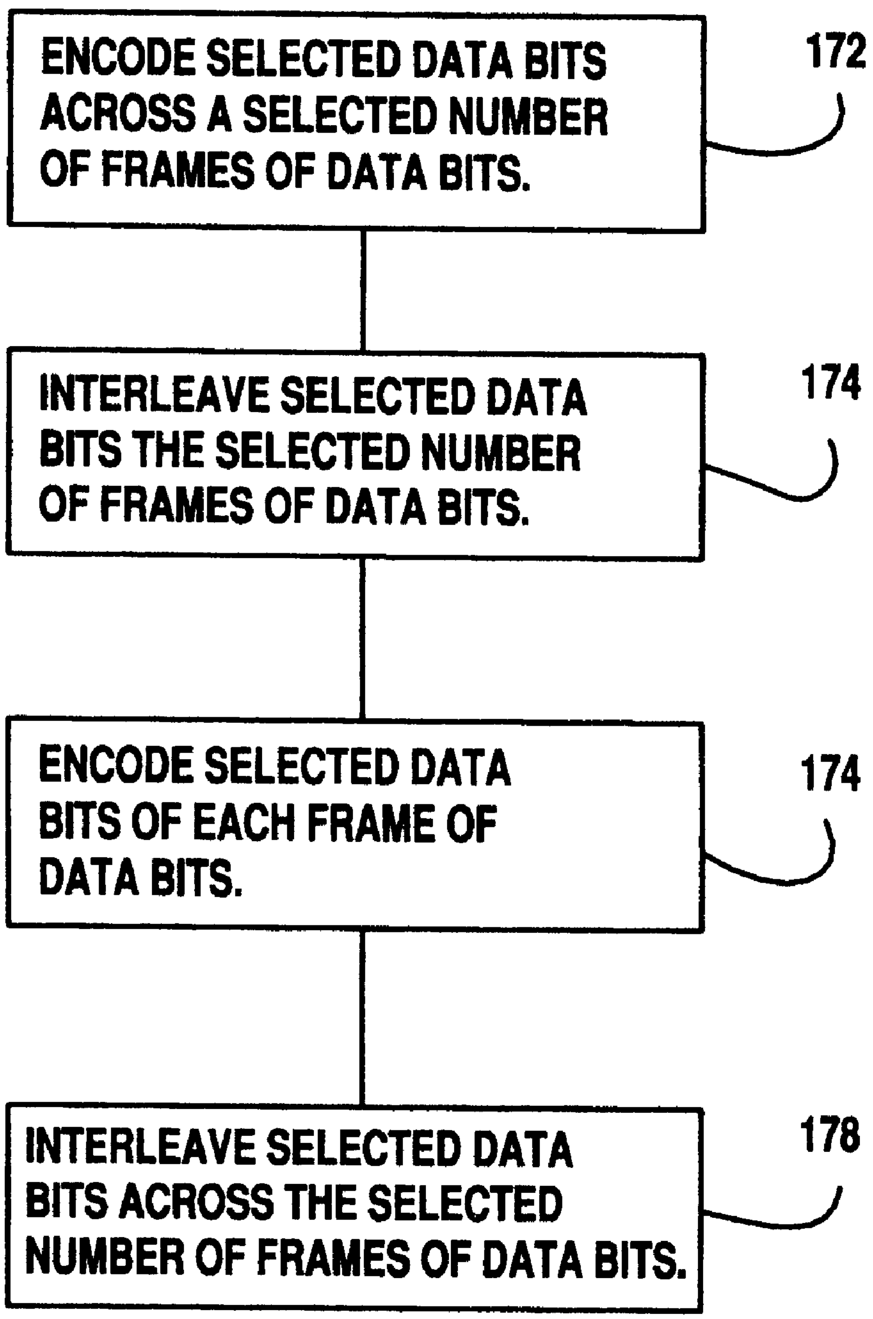
FIG. 8 illustrates a method flow diagram listing the method steps of the method of an embodiment of the present invention.

FIG. 8 illustrates a method, shown generally at 170, of an embodiment of the present invention. The method is operable to encode and interleave a communication signal to be transmitted by a communication station upon a communication channel. The communication signal is formed of successive frames of data bits.

First, as indicated by the block 172, at least selected data bits are encoded across a selected number of the successive frames of the data bits of the communication signal.

Then, and as indicated by the block 174, at least selected data bits are interleaved across the selected number of the successive frames of the data bits of the communication signal.

Then, and as indicated by the block 176, at least selected data bits of each frame of the selected number of the successive frames of the data bits are encoded.

And, as indicated by the block 178, at least selected data bits are interleaved across the selected number of the successive frames of the data bits.

By encoding and interleaving the communication signal in such a manner, the possibility that the informational content of the communication signal can be recovered even if transmitted upon a communication channel which exhibits significant levels of fading is more likely to be possible.

A method of an embodiment of the present invention is analogously operable to decode and deinterleave a multi-stage, encoded and interleaved signal. The steps of such a method are generally the reverse of those method steps illustrated in FIG. 8.

The need to ensure that the informational content of a communication signal transmitted upon a communication channel can be recovered with little or no error is particularly important when the informational content comprises data to be transmitted to a receiving station.

Operation of an embodiment of the present invention in a wireless communication system permits improved radio link performance without an undue increase in the transmission delay otherwise required to provide multi-stage encoding and interleaving. As the multi-stage encoding and interleaving can be performed at a single logical device, the entire interleaving and encoding operations may be performed at a radio base station which forms a downlink signal to be transmitted to a mobile terminal. Analogous circuitry formed at a mobile terminal permits recovery of the informational content of the downlink signal transmitted thereto. And, circuitry of the mobile terminal also permits the generation of multi-stage encoded and interleaved signals for transmission to a base station.

The previous descriptions are of preferred examples for implementing the invention, and the scope of the invention should not necessarily be limited by this description. The scope of the present invention is defined by the following claims.

What is claimed is:

1. In a communication station operable to transmit a communication signal upon a communication channel to a remote device, the communication signal formed of frames of data bits, an improvement of apparatus for encoding and interleaving the data bits prior to transmission thereof upon the communication channel, said apparatus comprising:

a single transmit buffer for receiving the frames of the data bits, said transmit buffer buffering a select number of the frames of the data bits;

an outer encoder coupled to receive the select number of the frames of the data bits, said outer encoder for encoding at least select ones of the data bits across the select number of the frames of the data bits;

an outer interleaver for interleaving the at least select data bits across the select number of the frames of the data bits provided by the single transmit buffer;

an inner encoder for encoding the at least select data bits of each frame of the select number of the frames of the data bits; and an inner interleaver for interleaving the at least select data bits across the select number of the frames of the data bits provided by said single transmit buffer;

whereby said single transmit buffer reduces the transmission delay of said communication signal upon said communication channel to said remote device.

2. The apparatus of claim 1 wherein said outer encoder encodes groups of the at least select data bits.

3. The apparatus of claim 2 wherein said outer encoder comprises a block encoder.

4. The apparatus of claim 1 wherein said outer interleaver interleaves groups of the at least select data bits.

5. The apparatus of claim 1 wherein said inner encoder encodes individual ones of the at least select data bits.

6. The apparatus of claim 5 wherein said inner encoder comprises a convolutional encoder.

7. The apparatus of claim 1 wherein said inner interleaver interleaves individual ones of the at least select data bits.

8. The apparatus of claim 1 further comprising a coding rate selector coupled to said outer encoder, said coding rate selector for selecting a coding rate at which said outer encoder is operable.

9. The apparatus of claim 1 further comprising a coding rate selector coupled to said inner encoder, said coding rate selector for selecting a coding rate at which said inner encoder is operable.

10. The apparatus of claim 1 further comprising a frame number selector coupled to said transmit buffer, said frame number selector for selecting the select number of the frames stored by said transmit buffer.

11. The apparatus of claim 1 wherein the communication station comprises a radio base station of a cellular communication system, the communication signal comprises a downlink signal, the communication channel comprises a downlink channel, the remote device comprises a mobile terminal operable in the cellular communication system and wherein said transmit buffer, said outer encoder, said outer interleaver, said inner encoder and said inner interleaver are formed at the radio base station.

12. The apparatus of claim 11 wherein the radio base station is further operable to receive an uplink signal upon an uplink channel transmitted by the mobile terminal, said apparatus further for decoding and deinterleaving the uplink signal once received thereat; the uplink signal also formed of frames of data bits, said apparatus comprising:

a single receive buffer for receiving the uplink signal, said receive buffer buffering a select number of the frames of the data bits forming the uplink signal;

an inner deinterleaver for deinterleaving at least select ones of the data bits across the select number of the frames of the data bits of which the uplink signal is formed provided by the single receive buffer;

an inner decoder for decoding at least the select data bits of each of the select number of the frames of the data bits of which the uplink signal is formed;

an outer deinterleaver for deinterleaving the at least select data bits across the select number of the frames of the data bits of which the uplink signal is formed provided by the single receive buffer; and an outer decoder coupled to receive the select number of frames of data bits of which the uplink signal is formed once deinterleaved by said outer deinterleaver, said outer decoder for decoding the at least select data bits across the select number of the frames of the data bits of which the uplink signal is formed.

13. The apparatus of claim 12 wherein said receive buffer, said inner deinterleaver, said inner decoder, said outer deinterleaver, and said outer decoder are formed at the radio base station.

14. The apparatus of claim 12 further comprising a frame number selector coupled to said receive buffer, said frame number selector for selecting the select number of the frames stored by said receive buffer.

15. The apparatus of claim 12 wherein said inner deinterleaver deinterleaves individual ones of the at least select data bits of the select number of the frames of the data bits of which the uplink signal is formed.

16. The apparatus of claim 12 wherein said inner decoder decodes individual ones of the at least select data bits.

17. The apparatus of claim 15 wherein said inner decoder comprises a convolutional decoder.

18. The apparatus of claim 12 wherein said outer deinterleaver deinterleaves groups of the at least select data bits.

19. The apparatus of claim 12 wherein said outer decoder decodes groups of the at least select data bits.

20. The apparatus of claim 18 wherein said outer decoder comprises a block decoder.

21. The apparatus of claim 12 further comprising a decoding rate selector coupled to said inner decoder, said decoding rate selector for selecting a decoding rate at which said inner decoder is operable.

22. The apparatus of claim 12 further comprising a decoding rate selector coupled to said outer decoder, said decoding rate selector for selecting a decoding rate at which said outer decoder is operable.

23. In a communication station operable to transmit an uplink signal upon an uplink channel to a remote device, an improvement of apparatus for encoding and interleaving the uplink signal prior to transmission thereof upon the uplink, the uplink signal formed of frames of data bits, said apparatus comprising:

a single transmit buffer for receiving the frames of the data bits, said transmit buffer buffering a select number of the frames of the data bits;

an outer encoder for encoding at least select ones of the data bits across the select number of the frames of the data bits;

an outer interleaver for interleaving the at least select data bits across the select number of the frames of the data bits provided by the single transmit buffer;

an inner encoder for encoding the at least select data bits of each frame of the select number of the frames of the data bits; and an inner interleaver for interleaving the at least select data bits across the select number of the frames of the data bits provided by the single transmit buffer;

whereby said single transmit buffer reduces the transmission delay of said uplink signal upon said uplink channel to said remote device.

24. The apparatus of claim 23 wherein the communication station comprises a mobile terminal operable in a cellular communication system, the remote device comprises a radio base station operable in the cellular communication system and wherein said transmit buffer, said outer encoder, said outer interleaver, said inner encoder and said inner interleaver are formed at the mobile terminal.

25. The apparatus of claim 23 wherein the communication station is further operable to receive a downlink signal upon a downlink channel transmitted by the remote device, said apparatus further for decoding and deinterleaving the downlink signal once received thereat, the downlink signal also formed of frames of data bits, said apparatus comprising:

a single receive buffer coupled to receive the downlink signal, said receive buffer buffering a select number of the frames of the data bits forming the downlink signal;

an inner deinterleaver for deinterleaving at least select ones of the data bits across the select number of the frames of the data bits of which the downlink signal is formed provided by said single receive buffer;

an inner decoder for decoding the at least select data bits of each of the select number of the frames of the data bits of which the downlink signal is formed;

an outer deinterleaver for deinterleaving the at least select data bits across the select number of the frames of the data bits of which the downlink signal is formed provided by said single receive buffer; and an outer decoder for decoding the at least select data bits across the select number of the frames of the data bits of which the downlink signal is formed.

26. A method for encoding and interleaving a communication signal to be transmitted by a communication station upon a communication channel, the communication signal formed of successive frames of data bits, said method comprising the steps of:

buffering a select number of the successive frames of the data bits of the communication signal;

encoding at least select ones of the data bits across the buffered select number of the successive frames of the data bits of the communication signal;

interleaving at least groups of the select data bits across the buffered select number of the successive frames of the data bits of the communication signal;

encoding the at least select data bits of each frames of the buffered select number of the successive frames of the data bits of the communication signal; and interleaving the at least select data bits across the buffered select number of the successive frames of the data bits of the communication signal.

27. The method of claim 26 wherein the communication signal is transmitted upon the communication channel to a remote device and wherein said method further comprises the steps, once the communication signal is received at the remote device, of:

buffering the select number of the successive forms of the data bits of the communication signal;

deinterleaving at least groups of the select data bits across the buffered select number of the successive frames of the data bits;

decoding the at least select data bits of each of the buffered select number of the successive frames of the data bits;

deinterleaving the at least select data bits across the buffered select number of the successive frames of the data bits; and decoding the at least selected data bits across the buffered select number of the successive frames of the data bits.

* * * * *

UNITED STATES PATENT AND TRADEMARK OFFICE

CERTIFICATE OF CORRECTION

PATENT NO. : 5,946,357

DATED : Aug. 31, 1999

INVENTOR(S) : Sandin et al.

It is certified that error appears in the above-identified patent and that said Letters Patent is hereby corrected as shown below:

Column 3, line 25 Replace "$10^{31\ 3}$"
With --$10^{-3}$--

Signed and Sealed this

Twenty-second Day of February, 2000

Attest:

Q. TODD DICKINSON

*Attesting Officer* *Commissioner of Patents and Trademarks*